(12) United States Patent
Kim (10) Patent No.: US 9,247,550 B2
(45) Date of Patent: Jan. 26, 2016

(54) METHOD OF ALLOCATING RADIO RESOURCES AND APPARATUS FOR PERFORMING THE SAME

(71) Applicant: Electronics and Telecommunications Research Institute, Deajeon (KR)

(72) Inventor: Dae Ik Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 146 days.

(21) Appl. No.: 13/837,130

(22) Filed: Mar. 15, 2013

(65) Prior Publication Data

US 2013/0242909 A1    Sep. 19, 2013

(30) Foreign Application Priority Data

Mar. 19, 2012    (KR) ........................ 10-2012-0027673

(51) Int. Cl.
*H04W 4/00*    (2009.01)
*H04W 72/08*    (2009.01)
*H04L 1/00*    (2006.01)
*H04L 1/20*    (2006.01)

(52) U.S. Cl.
CPC ............. *H04W 72/08* (2013.01); *H04L 1/0003* (2013.01); *H04L 1/0007* (2013.01); *H04L 1/0009* (2013.01); *H04L 1/203* (2013.01)

(58) Field of Classification Search
CPC ............. H04L 1/0026; H04W 72/085; H04W 72/087; H04W 72/1226; H04W 72/1231; H04W 72/1236; H04W 72/04; H04W 72/0413
USPC .................................. 370/310–350, 431–463
See application file for complete search history.

(56) References Cited

U.S. PATENT DOCUMENTS

2005/0233754 A1*  10/2005  Beale .......................... 455/452.2
2007/0189235 A1*   8/2007  Chandra et al. ................ 370/335
2013/0343215 A1*  12/2013  Li et al. ......................... 370/252

FOREIGN PATENT DOCUMENTS

KR   10-2008-0095132     10/2008

* cited by examiner

*Primary Examiner* — Ricky Ngo
*Assistant Examiner* — Wei-Po Kao
(74) *Attorney, Agent, or Firm* — Nelson Mullins Riley & Scarborough LLP

(57) ABSTRACT

A method and an apparatus perform radio resource allocation. The radio resource allocation method includes receiving channel quality information from a UE, and allocating radio resources on the basis of the received channel quality information and a characteristic of at least one service to be provided to the UE. Accordingly, the radio resource allocation method can assure QoS, and enhance resource-use efficiency.

8 Claims, 4 Drawing Sheets

(A) CONTROL-PLANE PROTOCOL STACK (B) USER-PLANE PROTOCOL STACK

METHOD OF ALLOCATING RADIO RESOURCES AND APPARATUS FOR PERFORMING THE SAME

CLAIM FOR PRIORITY

This application claims priority to Korean Patent Application No. 10-2012-0027673 filed on Mar. 19, 2012 in the Korean Intellectual Property Office (KIPO), the entire contents of which are hereby incorporated by reference.

BACKGROUND

1. Technical Field

Example embodiments of the present invention relate in general to a radio communication system and more specifically to a method of allocating radio resources and an apparatus for performing the same, which can enhance resource-use efficiency.

2. Related Art

The Long Term Evolution (LTE) system and/or the LTE-advanced system of the 3rd Generation Partnership Project (3GPP) support(s) a plurality of radio bearers to one mobile terminal, for providing services having various characteristics to mobile terminals. That is, mobile terminals receive a service through radio bearers having different qualities of service (QoSs) depending on a desired QoS.

In the LTE or LTE-advanced system, when a mobile terminal performs initial access, a base station sets one default radio bearer. Here, a service is provided through the default radio bearer depending on a current radio resource state, with no consideration of QoS.

Subsequently, when provision of a QoS-requiring service to a mobile terminal is started, the base station allocates a dedicated radio bearer to the mobile terminal, allocates resources on the basis of provided QoS information (for example, traffic transmission priority, transmission rate, delay time, etc.), and transmits traffic to the mobile terminal using the allocated resources. At this point, when there are simultaneously traffic to be transmitted through the default radio bearer and traffic to be transmitted through the dedicated radio bearer, the base station may allocate more resources to the dedicated radio bearer than the default radio bearer on the basis of the provided QoS information and thus transmit more traffic through the dedicated radio bearer, or allocate all available resources to the dedicated radio bearer without allocating any resources to the default radio bearer and thus transmit all traffic through the dedicated radio bearer whose QoS is assured.

That is, the base station performs multiplexing for all radio bearers which are set between the base station and the mobile terminal, for transmitting traffic to the mobile terminal, and distributes resources (which are used to transmit the traffic) to a plurality of radio bearers in consideration of priority and a transmission rate depending on the QoS characteristics of the radio bearers.

Moreover, the base station adjusts the amount of data transmitted to the mobile terminal depending on a channel state. That is, when the channel state is poor because the mobile terminal is located far away from the base station, the base station selects a low modulation scheme to transmit a small amount of data, and when the channel state is good because the mobile terminal is located near the base station, the base station selects a high modulation scheme to increase a data transmission rate.

The base station selects a modulation scheme on the basis of channel quality indicator (CQI) information reported from the mobile terminal. For example, the base station decides a modulation and coding scheme (MCS) such that a block error rate (BLER) of a physical layer becomes 0.1% or less, depending on a CQI value reported from the mobile terminal.

That is, the base station first decides a traffic transmission amount to be transmitted to the mobile terminal on the basis of a CQI transmitted from the mobile terminal, allocates resources within a range of the traffic transmission amount which has been decided depending on the QoS characteristic of the radio bearer allocated to the mobile terminal, and transmits traffic.

According to the above-described conventional resource allocation method, an MCS is first selected on the basis of a CQI value reported from a mobile terminal such that the BLER of the physical layer becomes 0.1% or less, a data transmission rate is decided, and resources are allocated within a range of the decided data transmission rate. For this reason, the conventional resource allocation method is not suitable for a specific service sensitive to delay.

For example, since a real-time service such as a video service is sensitive to delay, by fundamentally applying a forward error correction (FEC) scheme (for example, error resilient video coding, forward erasure recovery, scalable video coding, etc.) for preventing delay caused by retransmission due to a packet error, the real-time service can be recovered even when loss occurs within a certain range (for example, 5% or less).

Therefore, when data is transmitted by applying a BLER of 0.1% or less to all traffic for minimizing packet loss in a radio channel, a serious error can be caused. For example, when resources are allocated to a dedicated radio bearer (which is used to transmit video traffic in which a desired data transmission rate is 10 Mbps and a loss rate of 5% is allowable) so as to provide a data transmission of 9.5 Mbps to a mobile terminal for adjusting a BLER to 0.1% in the physical layer, the mobile terminal cannot use a corresponding service.

SUMMARY

Accordingly, example embodiments of the present invention are provided to substantially obviate one or more problems due to limitations and disadvantages of the related art.

Example embodiments of the present invention provide a radio resource allocation method for efficiently allocating radio resources and satisfying a desired QoS.

Example embodiments of the present invention also provide a radio resource allocation apparatus for efficiently allocating radio resources and satisfying a desired QoS.

In some example embodiments, a radio resource allocation method performed in a radio resource allocation apparatus includes: receiving channel quality information from a user equipment (UE); and allocating radio resources on the basis of the received channel quality information and characteristic of at least one service to be provided to the UE.

The receiving of channel quality information may include receiving channel quality indicator (CQI) information from the UE.

The allocating of radio resources may include: deciding a block error rate (BLER) for at least one radio bearer in consideration of the characteristic of the at least one radio bearer and the channel quality information, the at least one radio bearer being generated in correspondence to the at least one service to be provided to the UE; and deciding a modulation and coding scheme (MCS) on the basis of the decided BLER for the at least one radio bearer.

The allocating of radio resources may further include: calculating a data size allocable to the at least one radio bearer according to the decided MCS; and multiplexing data to be transmitted for the at least one radio bearer on the basis of the calculated data size.

The characteristic of the at least one radio bearer may include at least one of a packet error rate (PER), a packet loss rate (PLR), and a packet error loss rate (PLER) which the at least one radio bearer desires.

In other example embodiments, a radio resource allocation apparatus includes: an MAC layer configured to receive channel quality information from a UE, and allocate radio resources on the basis of the received channel quality information and a characteristic of at least one service to be provided to the UE; and a PHY layer configured to perform coding and modulation for data to be provided to the UE on the basis of radio resource allocation information provided from the MAC layer.

The MAC layer may receive a CQI as the channel quality information from the UE.

The MAC layer may decide a BLER for at least one radio bearer in consideration of the characteristic of the at least one radio bearer and the channel quality information, and decide an MCS on the basis of the decided BLER, the at least one radio bearer being generated by an upper layer of the MAC layer in correspondence to the at least one service to be provided to the UE.

The MAC layer may calculate a data size allocable to the at least one radio bearer according to the decided MCS, multiplex data to be transmitted on the basis of the calculated data size, provide the multiplexed data to the PHY layer, and provide the decided MCS information to the PHY layer.

The characteristic of the at least one radio bearer may include at least one of a PER, a PLR, and a PLER which the at least one radio bearer desires.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

The invention may have diverse modified embodiments, and thus example embodiments are illustrated in the drawings and are described in the detailed description of the invention.

However, this does not limit the invention within specific embodiments and it should be understood that the invention covers all the modifications, equivalents, and replacements within the idea and technical scope of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meanings as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the invention will be described in detail with reference to the accompanying drawings. In describing the invention, to facilitate the entire understanding of the invention, like numbers refer to like elements throughout the description of the figures, and a repetitive description on the same element is not provided.

The term "user equipment" used in the specification may refer to a mobile station (MS), a user equipment (UE), a user terminal (UT), a wireless terminal, an access terminal (AT), a terminal, a subscriber unit, a subscriber station (SS), a wireless device, a radio communication device, a wireless transmit/receive unit (WTRU), a mobile node, a mobile, etc. Various embodiments of the terminal may include a cellular phone, a smart phone having a radio communication function, a personal digital assistant (PDA) having a radio communication function, a wireless modem, a portable computer having a radio communication function, a capturing device such as a digital camera having a radio communication function, a game device having a radio communication function, a music storage and replay appliance having a radio communication function, an Internet appliance enabling wireless Internet access and browsing, and a terminal or a portable unit having a combination of the functions, but the present invention is not limited thereto.

The term "base station" used in the specification may refer to a part that is generally fixed or moves to communicate with terminals, and may collectively include a base station, a node-B, an eNode-B, a base transceiver system, an access point, a relay, a femto cell, etc.

Figure 1:
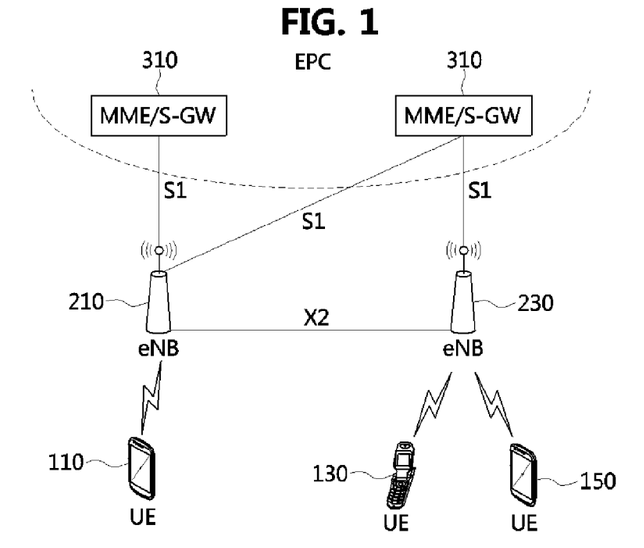
FIG. 1 is a conceptual diagram illustrating a configuration of a wireless access network.

FIG. 1 is a conceptual diagram illustrating a configuration of a wireless access network, and exemplarily illustrates an LTE or LTE-advanced system.

Referring to FIG. 1, a user equipment (UE) 110 is wirelessly connected to a base station 210. UEs 130 and 150 are wirelessly connected to a base station 230, and transmit/receive control signals and data to/from the base station 230.

Each of the base stations 210 and 230 controls a UE connected thereto, and performs functions such as control of a radio bearer, radio admission control, mobility control, and resource allocation (scheduling) for uplink/downlink data transmission, for providing various services to the UE. Here, the base stations 210 and 230 may be connected to each other through a backhaul link, and may exchange information for control of a UE and a data service. In the LTE system, the base stations 210 and 230 may be connected to each other through an X2 interface.

A mobility management entity (MME)/serving-gateway (S-GW) 310 is an entity included in an Evolved Packet Core (EPC). An MME mainly performs a session control function for each UE, and an S-GW mainly performs a traffic routing function of each UE. Here, the MME/S-GW 310 is connected to the base stations 210 and 230 through an Si interface.

In a mobile communication system illustrated in FIG. 1, when a new session generation request is received from the MME, each of the base stations 210 and 230 generates a radio bearer on the basis of QoS information on a requested session, schedules user traffic data transmitted from the S-GW depending on a channel environment of a user equipment, and transmits data to corresponding UEs 110, 130 and 150 using the scheduled resources.

Figure 2:
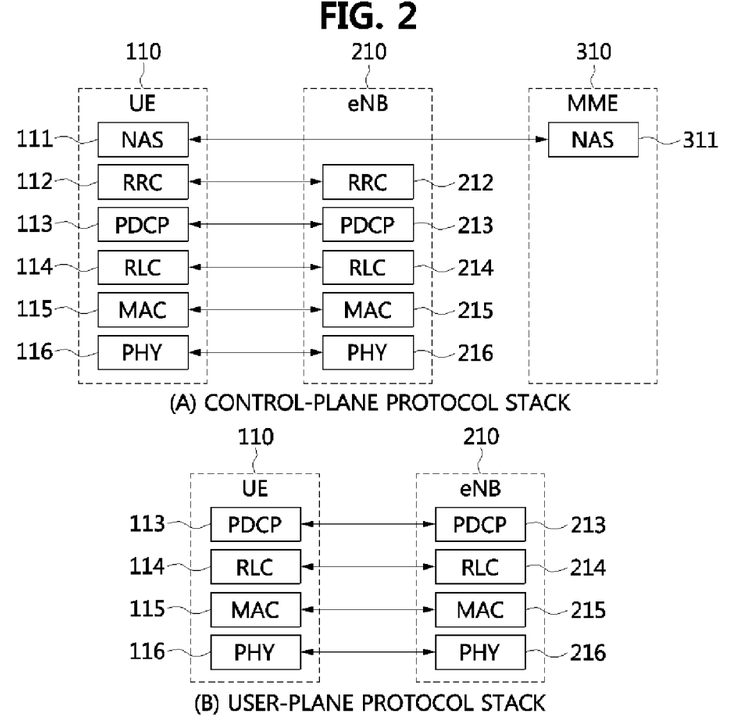
FIG. 2 is a conceptual diagram illustrating a control-plane protocol stack and user-plane protocol stack of the wireless access network.

FIG. 2 is a conceptual diagram illustrating a control-plane protocol stack and user-plane protocol stack of the wireless access network. FIG. 2A illustrates the control-plane protocol stack, and FIG. 2B illustrates the user-plane protocol stack.

Referring to FIG. 2, non-access stratum (NAS) layers 111 and 311 are placed in respective upper portions of the UE 110 and MME 310. Particularly, the NAS layer of the MME 310 performs functions such as Evolved Packet System (EPS) bearer management, authentication, mobility management of an idle-mode UE, and paging of the idle-mode UE, and security control. Here, an NAS message sent from the UE 110 or MME 310 is added to radio resource control (RRC) without a separate change by the base station 210, and sent to the MME 310 or the UE 110.

An RRC layer 112 is placed in the UE 110, and an RRC layer 212 is placed in the base station 210. Specifically, the RRC layer 212 of the base station 210 performs functions such as broadcast, paging, RRC connection management, radio bearer control, mobility management, UE measurement reporting and control.

Moreover, when a new session generation request is received from the MME 310, the RRC layer 212 of the base station 210 requests the generation of a new radio bearer from a packet data convergence protocol (PDCP) layer 213, a radio link control (RLC) layer 214, and a medium access control (MAC) layer 215, based on a desired QoS, and informs the UE 110 that the new radio bearer has been generated, thereby performing a radio bearer control function.

A PDCP layer 113 is placed in the UE 110, and the PDCP layer 213 is placed in the base station 210. The PDCP layers 113 and 213 perform an Internet protocol (IP) header compression/decompression function for decreasing the number of bits transmitted through a wireless interface, and a ciphering and integrity protection function for transmission data. Also, the PDCP layers 113 and 213 support realignment and retransmission by a protocol data unit (PDU) when handover is being performed.

An RLC layer 114 is placed in the UE 110, and the RLC layer 214 is placed in the base station 210. The RLC layers 114 and 214 perform functions such as PDCP PDU transmission, error recovery using an automatic repeat request (ARQ), and disassembly/reassembly of an RLC service data unit (SDU). Also, the RLC layers 114 and 214 perform a realignment function for compensating for a change (caused by a hybrid ARQ (HARQ) of a lower layer) in a reception order.

An MAC layer 115 is placed in the UE 110, and the MAC layer 215 is placed in the base station 210. The MAC layers 115 and 215 perform functions such as uplink and downlink scheduling, mapping between logical channels and transport channels, multiplexing/de-multiplexing by the MAC SDU, and error recovery using the HARQ.

A physical (PHY) layer 116 is placed in the UE 110, and a PHY layer 216 is placed in the base station 210. The PHY layers 116 and 216 perform functions such as coding/decoding, modulation/demodulation, and multiple antenna mapping for the MAC PDU provided from each of the MAC layers 115 and 215 that are upper layers, and transmit data through a wireless interface.

Figure 3:
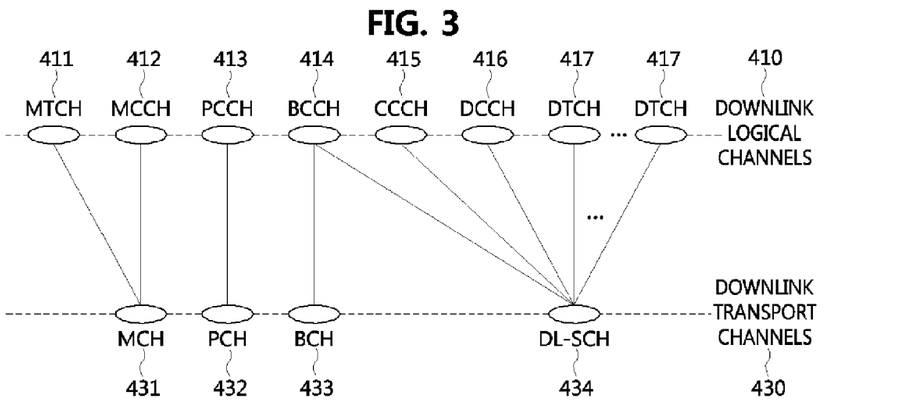
FIG. 3 is a conceptual diagram illustrating a channel mapping relationship performed in a media access control (MAC) layer of a base station.

FIG. 3 is a conceptual diagram illustrating a channel mapping relationship performed in an MAC layer of a base station, and illustrating a mapping relationship between downlink logical channels and downlink transport channels.

Referring to FIG. 3, a plurality of downlink logical channels 410 are channels managed by an MAC layer, defined based on the kind of transferred information, and mapped to downlink transport channels 430 of a PHY layer by the MAC layer.

A multicast traffic channel (MTCH) 411 for transmitting multimedia broadcast/multicast service (MBMS) traffic data and a multicast control channel (MCCH) 412 for transmitting control information necessary for reception of the MTCH 411 are mapped to a down transport channel multicast channel (MCH) 431.

A paging control channel (PCCH) 413, which is used for informing of a change in system information and paging a UE whose cell-unit position is not known to a network, is mapped to a paging channel (PCH) 432 that is a downlink transport channel.

A broadcast control channel (BCCH) 414 for broadcasting the system information is divided into a broadcast channel (BCH) 433 and a downlink shared channel (DL-SCH) 434 that are downlink transport channels, based on transmitted information, and mapped to a corresponding channel.

When an RRC connection between a UE and a base station is not established, a common control channel (CCCH) 415 for transmitting control information (for example, control information associated with random access) between the UE and the base station is mapped to the DL-SCH 434 that is the downlink transport channel.

When the RRC connection between the UE and the base station is established, a dedicated control channel (DCCH) 416 for transmitting dedicated control information between the UE and the base station is mapped to the DL-SCH 434 that is the downlink transport channel.

A dedicated transport channel (DTCH) 417 for transmitting user traffic data of a UE is mapped to the DL-SCH 434 that is the downlink transport channel.

Among the downlink logical channels of the MAC layer, the MTCH 411, MCCH 412, PCCH 413, BCCH 414, and CCCH 415 are channels shared by all UEs, and the DCCH 416 and DTCH 417 are logical channels dedicatedly allocated to the all UEs.

Moreover, each UE may have a plurality of the DTCHs 417 depending on the QoS of traffic data receiving a service. For example, when it is determined by an RRC layer of a base station that the generation of a new radio bearer for a UE is needed, the RRC layer requests desired QoS information and the generation of a new DTCH 417 from an MAC layer, and the MAC layer schedules user traffic data based on QoS information provided from the RRC layer to transmit the user traffic data to a corresponding UE. Here, the QoS information may include a QoS class identifier (QCI), a resource type, priority, a packet delay parameter (packet delay budget), and a packet loss error rate (PLER), and each of the DCCH 416 and DTCH 417 allocated to the UE is classified as a logical channel identity (LCID).

Moreover, an MAC layer performs scheduling and multiplexing to transmit data by using the DCCH 416 and DTCH 417 allocated to all UEs and the BCCH 414 and CCCH 415 mapped to the DL-SCH 434.

Figure 4:
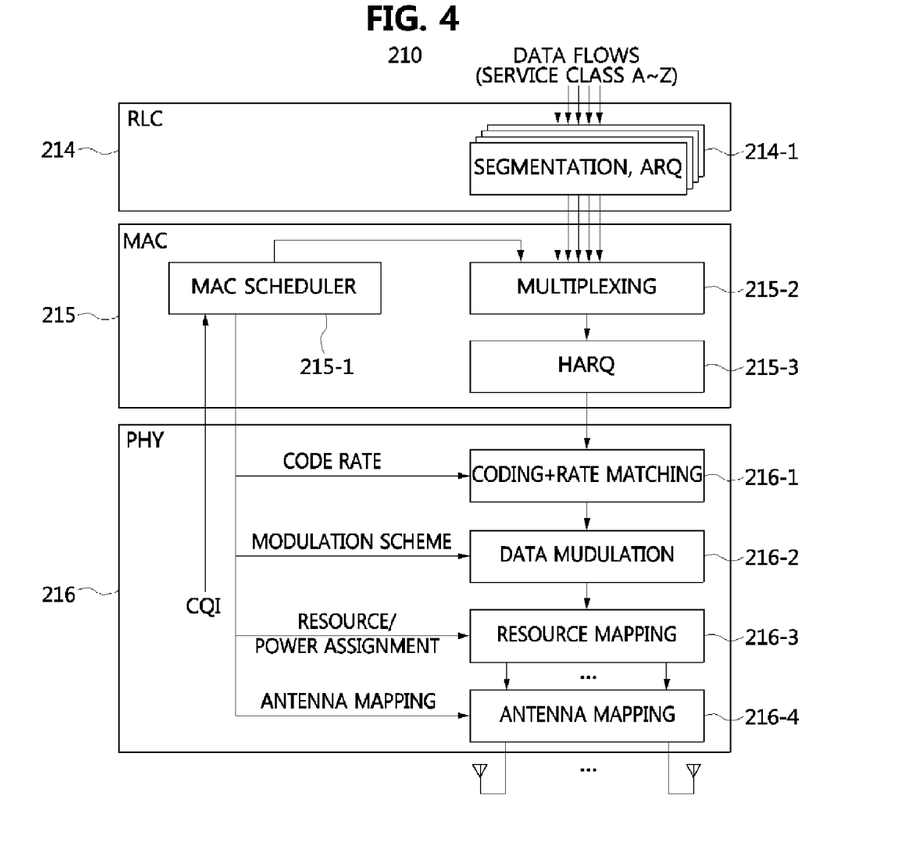
FIG. 4 is a conceptual diagram illustrating an operation of processing data traffic to be transmitted to one user equipment by a base station.

FIG. 4 is a conceptual diagram illustrating an operation of processing data traffic to be transmitted to one UE by a base station.

Referring to FIG. 4, the RLC layer 214 classifies data flows (provided from an upper layer (for example, PDCP layer)) by radio bearer, and provides the classified data flows to the MAC layer 215. Here, each of the data flows is transmitted to one UE, and as described above with reference to FIG. 3, may be configured with dedicated radio bearers having difference service classes. The RLC layer 214 segments or concatenates RLC SDUs included in the data flow to generate an RLC PDU having an appropriate size in operation 214-1, and provides the generated RLC PDU to the MAC layer 215.

The MAC layer 215 multiplexes the RLC PDU provided from the RLC layer 214 into an MAC PDU in operation 215-2. Here, the multiplexing is performed for all radio bearers allocated to a UE, and performed according to control by an MAC scheduler 215-1.

The MAC scheduler 215-1 uses CQI information reported from the UE for calculating a traffic amount transmittable to the UE. The CQI is a value indicating a radio channel state in a current position of the UE. When the CQI value is low, the CQI indicates that the channel state is poor, and thus the MAC scheduler 215-1 may select a low MCS level for data transmission and transmit a small amount of data. Alternatively, when the CQI value is high, the CQI indicates that the channel state is good, and thus the MAC scheduler 215-1 may select a high MCS level for data transmission and transmit a large amount of data.

CQI information is reported each time a predetermined specific event occurs, or reported periodically. Whenever a CQI is reported from a UE, the MAC scheduler 215-1 calculates a data size capable of being transmitted at one time such that a BLER becomes a specific value (for example, 0.1%) or less in a radio link, based on the reported CQI information.

Subsequently, the MAC scheduler 215-1 of a base station generates an MAC PDU corresponding to the calculated data size. Here, the MAC PDU is generated by multiplexing the RLC PDU transmitted from the MAC layer 215 depending on characteristic of a radio bearer in operation 215-2. Multiplexing between radio bearers allocated to a UE is determined with QoS characteristics of the radio bearers, and particularly, priority, a delay time, or a transmission rate. Since the size of data to transmit is first calculated in order for a BLER to meet a specific value (for example, 0.1%) in wireless transmission, a PLER is not considered.

The multiplexed MAC PDU is transmitted to the PHY layer 216 through an HARQ function 215-3. A PHY layer receives the instruction of an MCS level (i.e., MCS) of a corresponding PDU from the MAC scheduler 215-1, performs coding 216-1 and modulation 216-2 for a corresponding MAC PDU according to the instructed MCS, maps coded and modulated resources to physical resources in operation 216-3, maps the mapped resources to a corresponding antenna according to a transmission scheme, and transmits the mapped resources to the UE.

At present, in the LTE or LTE-advanced system, since an MAC scheduler decides a data transmission rate for adjusting a BLER to 0.1% on the basis of CQI information reported from a UE, a PLER among characteristics of each radio bearer is not considered. Due to such a scheduling scheme, an application layer includes an error correction function, and thus, even when loss occurs within a certain range, it is impossible to allocate the optimal resources for services enabling recovery of the loss among real-time services.

For example, when scheduling is performed for a UE (desiring to receive a service in which a desired transmission rate is 10 Mbps and a loss rate of 5% is allowable) so as to provide a data transmission of 9.5 Mbps for adjusting a BLER of 0.1% in radio transmission, it is substantially impossible to provide the service to the UE. In such a service, when data is transmitted by applying the BLER such that a PLER becomes 5% or less, an application layer of the UE recovers data in an FEC scheme even though more loss occurs in a radio link, thus satisfying QoS.

As another example with the consideration of the PLER, in a channel environment in which a UE receives a service of 10 Mbps at the BLER of 0.1%, when a service of 12 Mbps is provided by applying the BLER such that the PLER becomes 5% or less, a service suitable for 12 Mbps can be provided by enhancing QoS, and when data is transmitted at 10 Mbps, resource-use efficiency can be enhanced by using a smaller amount of radio resources.

Figure 5:
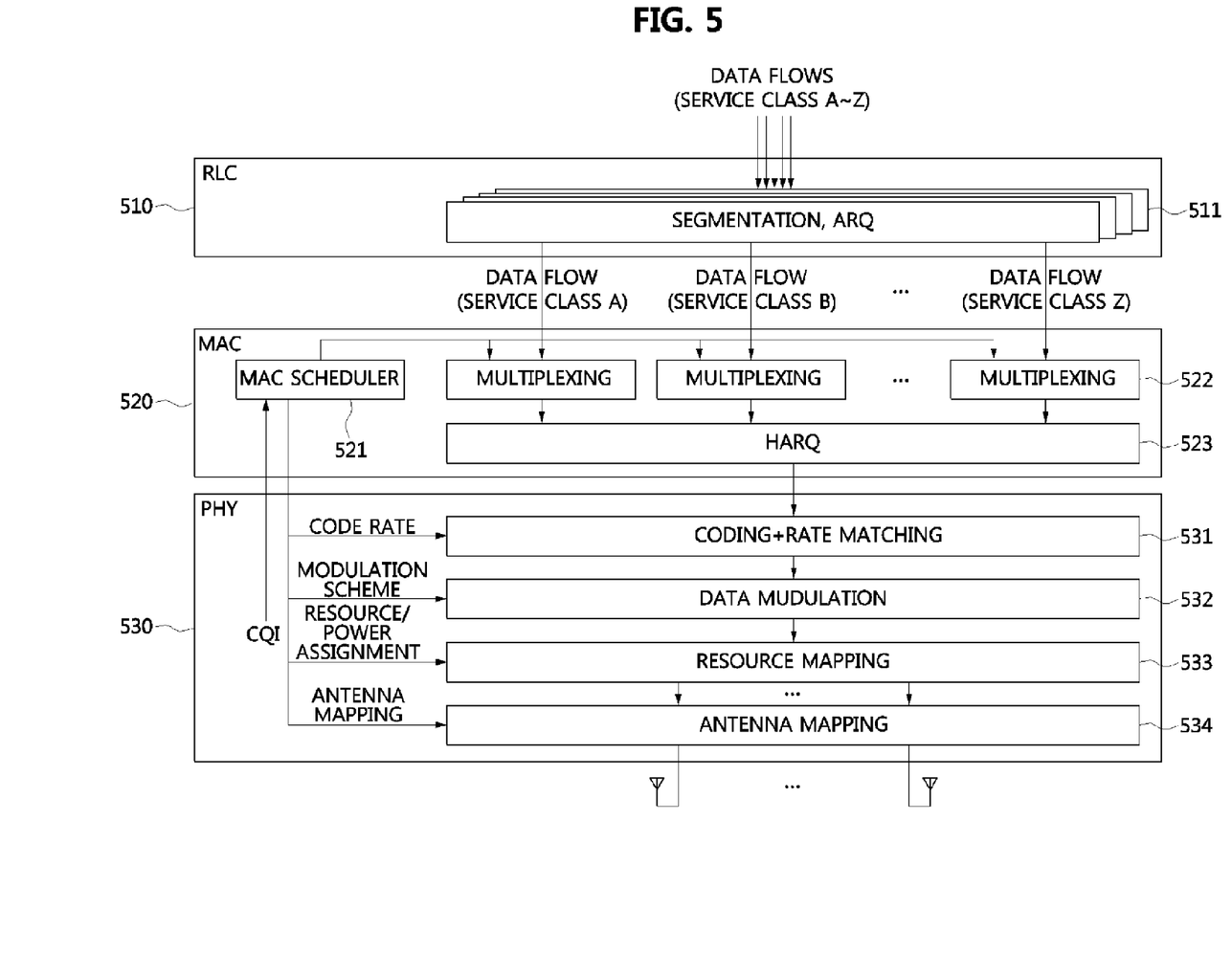
FIG. 5 is a conceptual diagram illustrating an operation of a base station that performs a radio resource allocation method according to an embodiment of the present invention.

FIG. 5 is a conceptual diagram illustrating an operation of a base station that performs a resource allocation method according to an embodiment of the present invention.

Referring to FIG. 5, unlike the resource allocation method of FIG. 4, in the resource allocation method according to an embodiment of the present invention, multiplexing is performed by differently applying the BLERs of respective radio bearers depending on characteristics of the radio bearers, thereby allocating resources efficiently.

Specifically, an RLC layer 510 segments or concatenates RLC SDUs by radio bearers having different service classes in a data flow provided from an upper layer (for example, PDCP layer), thereby generating an RLC PDU in operation 511. Then, the RLC layer 510 provides the RLC PDU to an MAC layer 520.

When channel state information (for example, CQI) is reported from a mobile terminal, an MAC scheduler 521 of the MAC layer 520 decides BLERs by radio bearer in consideration of the reported channel state information and characteristics of the radio bearers, and decides an MCS on the basis of the decided BLERs. Here, the MAC scheduler 521 may consider at least one of a packet loss rate (PLR), a packet error rate (PER), and the PLER as a characteristic of each radio bearer for deciding the BLER.

In the following description, for convenience, it is assumed that the MAC scheduler 521 decides BLERs by radio bearer in consideration of channel state information reported from a UE and the PLER of each radio bearer.

The MAC scheduler 521, as described above, decides BLERs by radio bearer, decides an MCS on the basis of the decided BLERs, and calculates a data size allocable to each radio bearer according to the decided MCS.

Subsequently, the MAC scheduler 521 performs control to multiplex an RLC PDU provided from the RLC layer on the basis of the calculated data size for each radio bearer in operation 522, thereby allowing an MAC SDU to be generated. An MAC header is added to the generated MAC SDU to configure a transport block, which is provided to a PHY layer 530 through an HARQ function 523.

Moreover, the MAC scheduler 521 notifies the PHY layer 530 of the decided MCS. Here, the MAC scheduler 521 may perform resource mapping, power control, and control necessary for antenna mapping, which are performed in the PHY layer 530.

The PHY layer 530 performs coding and rate matching for the transport block provided from the MAC layer 520 on the basis of coding information provided from the MAC layer 520 in operation 531.

Then, the PHY layer 530 performs modulation on the basis of modulation scheme information provided from the MAC layer 520 in operation 532, maps a modulated signal to physical resources in operation 533, and maps the physical resources to a corresponding antenna according to a corresponding transmission scheme decided from among transmission schemes such as transmission diversity, beamforming, and spatial multiplexing in operation 534.

Figure 6:
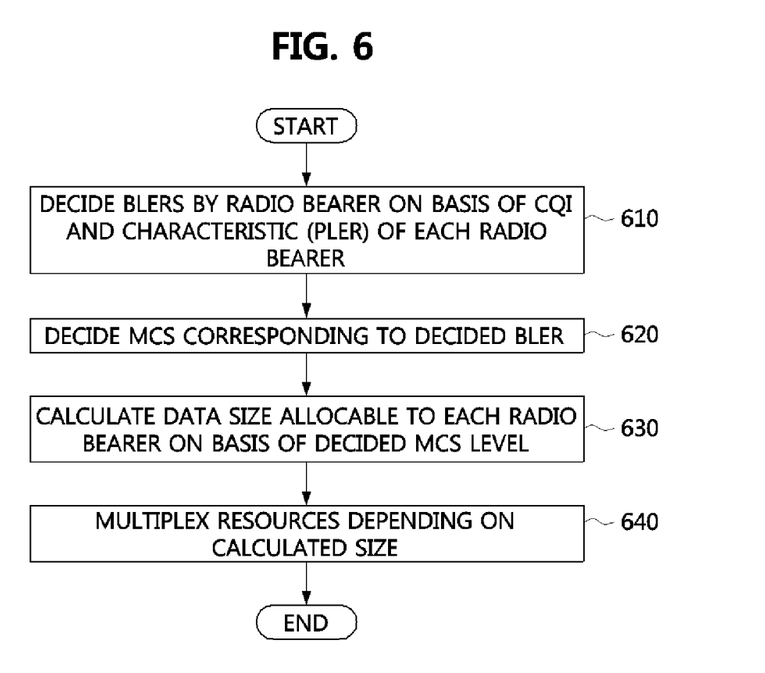
FIG. 6 is a flowchart illustrating the radio resource allocation method according to an embodiment of the present invention.

FIG. 6 is a flowchart illustrating a radio resource allocation method of a radio communication system according to an embodiment of the present invention, and illustrates a radio resource allocation method performed by the MAC layer of the base station of FIG. 5.

Referring to FIG. 6, when channel state information (for example, CQI) is reported from a mobile terminal, the MAC layer decides BLERs by radio bearer in consideration of the reported channel state information and characteristics of the radio bearers provided from an upper layer (for example, RLC layer) in operation 610.

Subsequently, the MAC layer decides an MCS for allocation resources on the basis of the decided BLERs in operation 620. Here, the MAC layer may consider at least one of a PLR, a PER, and a PLER as a characteristic of each radio bearer for deciding the BLER.

The MAC layer decides the BLERs by radio bearer by performing operations 610 and 620, and decides the MCS on the basis of the decided BLERs. Then, the MAC layer calculates a data size (or data transmission rate) allocable to each radio bearer according to the decided MCS in operation 630.

Subsequently, the MAC layer multiplexes an RLC PDU provided from the RLC layer on the basis of the calculated data size for each radio bearer to generate an MAC PDU, and provides the generated MAC PDU to the PHY layer in operation 640. Here, the MAC layer may notify the PHY layer of the decided MCS, and perform resource mapping, power control, and control necessary for antenna mapping, which are performed in the PHY layer.

As illustrated in FIG. 6, the radio resource allocation method according to an embodiment of the present invention decides BLERs by radio bearer in consideration of channel quality information provided from a UE and service characteristics such as a PLER, and decides an MCS on the basis of the decided BLER, thus satisfying desired QoS for each service and enhancing resource-use efficiency.

For example, the radio resource allocation method according to an embodiment of the present invention increases a BLER and applies a high MCS level in consideration of a case in which a service provided to a UE (which is located at a position having a poor channel environment) allows a high PLER, and thus can provide a service which a conventional resource allocation method cannot provide. Alternatively, when a service provided to a UE (located at a position in which a channel state is not poor) allows a high PLER, in the radio resource allocation method according to an embodiment of the present invention, a high MCS is set by applying a high BLER, and therefore a smaller amount of radio resources is allocated, thus enhancing radio resource-use efficiency and QoS.

According to the embodiments of the present invention, the radio resource allocation apparatus decides a BLER in consideration of both the channel state and desired service characteristic of a user equipment, and selects an MCS on the basis of the decided BLER.

Accordingly, the present invention decides the optimal data transmission rate for each service, and can assure desired QoS by using the decided data transmission rate. Also, by considering characteristics such as PLERs by service in allocating resources, the present invention can optimize resource allocation, thus enhancing resource-use efficiency.

While the example embodiments of the present invention and their advantages have been described in detail, it should be understood that various changes, substitutions and alterations may be made herein without departing from the scope of the invention.

What is claimed is:

1. A radio resource allocation method performed in a radio resource allocation apparatus, comprising:
   receiving channel quality information from a user equipment (UE);
   allocating radio resources on the basis of the received channel quality information and a characteristic of at least one radio bearer being generated in correspondence to at least one service to be provided to the UE,
   wherein the allocating of the radio resources decides a block error rate (BLER) for at the least one radio bearer in consideration of the characteristic of the at least one radio bearer and the channel quality information and decides a modulation and coding scheme (MCS) on the basis of the decided BLER for the at least one radio bearer; and
   calculating a data size allocable to the at least one radio bearer according to the decided MCS,
   wherein the data size allocated is capable of being transmitted at one time such that the BLER becomes less than a threshold based on the channel quality information.

2. The radio resource allocation method of claim 1, wherein the receiving of the channel quality information comprises receiving channel quality indicator (CQI) information from the UE.

3. The radio resource allocation method of claim 1, wherein the allocating of a radio resources further comprises multiplexing data to be transmitted for the at least one radio bearer on the basis of the calculated data size.

4. The radio resource allocation method of claim 1, wherein the characteristic of the at least one radio bearer comprises at least one of a packet error rate (PER), a packet loss rate (PLR), and a packet loss error rate (PLER) which the at least one radio bearer desires.

5. A radio resource allocation apparatus, comprising:
   an MAC layer configured to receive channel quality information from a user equipment (UE), and allocate radio resources on the basis of the received channel quality information and a characteristic of at least one radio bearer being generated in correspondence to at least one service to be provided to the UE; and
   a PHY layer configured to perform coding and modulation for data to be provided to the UE on the basis of radio resource allocation information provided from the MAC layer,
   wherein the MAC layer decides a block error rate (BLER) for the at least one radio bearer in consideration of the characteristic of the at least one radio bearer and the channel quality information, and decides a modulation and coding scheme (MCS) on the basis of the decided BLER,
   wherein the MAC layer calculates a data size allocable to the at least one radio bearer according to the decided MCS, and wherein the data size allocated is capable of being transmitted at one time such that the BLER becomes less than a threshold based on the channel quality information.

6. The radio resource allocation apparatus of claim 5, wherein the MAC layer receives a channel quality indicator (CQI) as the channel quality information from the UE.

7. The radio resource allocation apparatus of claim 5, wherein the MAC layer multiplexes the data to be transmitted on the basis of the calculated data size, provides the multiplexed data to the PHY layer, and provides the decided MCS information to the PHY layer.

8. The radio resource allocation apparatus of claim 5, wherein the characteristic of the at least one radio bearer comprises at least one of a packet error rate (PER), a packet loss rate (PLR), and a packet error loss rate (PLER) which the at least one radio bearer desires.

* * * * *

UNITED STATES PATENT AND TRADEMARK OFFICE
CERTIFICATE OF CORRECTION

PATENT NO. : 9,247,550 B2  Page 1 of 1
APPLICATION NO. : 13/837130
DATED : January 26, 2016
INVENTOR(S) : Dae Ik Kim It is certified that error appears in the above-identified patent and that said Letters Patent is hereby corrected as shown below:

Title page item (71) Applicant, delete "Deajeon" and insert --Daejeon-- in lieu thereof.

Signed and Sealed this
Twenty-eighth Day of June, 2016

Michelle K. Lee
*Director of the United States Patent and Trademark Office*